(12) United States Patent
Umesh et al.

(10) Patent No.: US 8,102,771 B2
(45) Date of Patent: Jan. 24, 2012

(54) TRANSMISSION RATE CONTROL METHOD, MOBILE STATION AND RADIO BASE STATION

(75) Inventors: Anil Umesh, Yokohama (JP); Masafumi Usuda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 637 days.

(21) Appl. No.: 11/913,225

(22) PCT Filed: May 2, 2006

(86) PCT No.: PCT/JP2006/309161
§ 371 (c)(1),
(2), (4) Date: Feb. 14, 2008

(87) PCT Pub. No.: WO2006/118303
PCT Pub. Date: Nov. 9, 2006

(65) Prior Publication Data
US 2009/0093218 A1    Apr. 9, 2009

(30) Foreign Application Priority Data
May 2, 2005  (JP) ................................ 2005-134646

(51) Int. Cl.
*G01R 31/08* (2006.01)
*G04B 1/00* (2006.01)
(52) U.S. Cl. .......................................... 370/235; 455/68
(58) Field of Classification Search .......................... None
See application file for complete search history.

(56) References Cited

U.S. PATENT DOCUMENTS

| 2002/0060996 | A1* | 5/2002 | Kwak et al. .................... 370/335 |
| 2004/0174846 | A1* | 9/2004 | Kwon et al. ................... 370/328 |
| 2004/0203448 | A1* | 10/2004 | Nagata ........................ 455/67.11 |
| 2004/0218533 | A1* | 11/2004 | Kim et al. ...................... 370/235 |
| 2005/0111379 | A1* | 5/2005 | Kim et al. ...................... 370/252 |
| 2005/0237932 | A1* | 10/2005 | Liu ............................... 370/230 |
| 2007/0206623 | A1* | 9/2007 | Tiedemann et al. .......... 370/431 |
| 2009/0245101 | A1* | 10/2009 | Kwon et al. .................. 370/226 |

FOREIGN PATENT DOCUMENTS

| JP | 2004-215276 | 7/2004 |
| JP | 2004328652 A | 11/2004 |

(Continued)

OTHER PUBLICATIONS

3GPP TSG RAN 2 #48 R2-052016, "Setting of Serving Grant with E-HICH Acknowledgment", NTT DoCoMo, Inc., London, UK, Aug. 29-Sep. 2, 2005, 4 pages.

(Continued)

*Primary Examiner* — Hassan Phillips
*Assistant Examiner* — Eunsook Choi
(74) *Attorney, Agent, or Firm* — Marvin A. Motsenbocker; Mots Law, PLLC

(57) ABSTRACT

In the conventional mobile communication system using an "Enhanced Uplink, the present invention improves a radio quality by preventing a decrease in a transmission rate of uplink user data, the decrease unintended by the radio base station Node B and caused by a false detection of a "Down" command in an RGCH." A transmission rate control method according to the present invention includes: transmitting, from a radio base station to a mobile station, a relative transmission rate control channel for instructing to decrease the transmission rate of the uplink user data, only when the uplink user data transmitted from the mobile station has been successfully received.

2 Claims, 6 Drawing Sheets

FOREIGN PATENT DOCUMENTS

| | | |
|---|---|---|
| JP | 2005039722 A | 2/2005 |
| KR | 20020011557 A | 2/2002 |
| WO | WO 00/42804 A1 | 7/2000 |
| WO | WO 2005/125259 A1 | 12/2005 |

OTHER PUBLICATIONS

3GPP TS 25.309 V6.2.0 (Mar. 2005), Technical Specification, 3rd Generation Partnership Project; Technical Specification Group Radio Access Network; FDD Enhanced Uplink; Overall description; Stage 2 (Release 6), 30 Pages.

Samsung; "EUL scheduling; signalling support" 3GPP TSG-RAN WG1 Meeting #38BIS; Seoul, Korea, XP-002366790; 6 sheets; (Sep. 20-24, 2004) (Cited in the counterpart European search report).

\* cited by examiner

TRANSMISSION RATE CONTROL METHOD, MOBILE STATION AND RADIO BASE STATION

TECHNICAL FIELD

The present invention relates to a transmission rate control method, a mobile station, and a radio base station, which controls a transmission rate of uplink user data.

BACKGROUND ART

In a conventional mobile communication system, in an uplink from a mobile station UE to a radio base station Node B, a radio network controller RNC is configured to determine a transmission rate of a dedicated channel, in consideration of radio resources of the radio base station Node B, an interference volume in an uplink, transmission power of the mobile station UE, transmission processing performance of the mobile station UE, a transmission rate required for an upper application, and the like, and to notify the determined transmission rate of the dedicated channel by a message in a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 11, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional mobile communication system, there has also been a problem that costs for implementing an apparatus and for operating a network are substantially increased even ff the fast control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data transmission is performed as shown in FIG. 12(a), the data are transmitted by accepting low-speed, high-delay, and low-transmission efficiency as shown in FIG. 12(b), or, as shown in FIG. 12(c), by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIG. 12.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

As disclosed in the non-patent document 1, in a conventional mobile communication system using the "enhanced uplink," the mobile station UE is configured to decrease the current transmission rate of uplink user data when the mobile station UE receives a relative transmission rate control channel (a relative grant channel: RGCH) instructing to decrease the transmission rate of uplink user data (that is, including a "Down" command) from the radio base station Node B.

Moreover, as disclosed in the non-patent document 1, an HARQ protocol is applied to the conventional mobile communication system using the "enhanced uplink." Accordingly, the radio base station Node B is configured to transmit a positive transmission acknowledgement signal (Ack) to the mobile station every time a reception/decoding processing on each of the transmission data blocks included in the uplink user data has been successful. In contrast, the radio base station Node B is configured to transmit a negative transmission acknowledgement signal (Nack) to the mobile station when the reception/decoding processing has not been successful.

The mobile station UE is configured to continue retransmission of the same transmission data block until a positive transmission acknowledgment signal (Ack) is received at the mobile station UE, or until the number of retransmissions reaches the maximum retransmission number predetermined by the radio network controller RNC.

Here, when the mobile station UE has received a "Down" command via the RGCH, the mobile station UE is configured to decrease the transmission rate of the uplink user data regardless of "Ack/Nack/DTX" on an HICH.

Meanwhile, the radio base station Node B is configured to determine an increase or decrease of the transmission rate of the uplink user data, regardless of the result of a reception/decoding processing of the transmission data block, and to notify the determined result (an "Up" command or a "Down" command) to the mobile station UE via the RGCH.

In the conventional mobile communication system using the "enhanced uplink", when the radio base station Node B transmits the negative transmission acknowledgment signal (Nack) due to a reception error at the radio base station Node B, the mobile station UE continues retransmission unless a reception error of "Ack/Nack" on the HICH occurs. Hence, the transmission rate of the uplink user data remains unchanged.

However, there has been a problem that, if the mobile station UE assumes a "DTX" included in the RGCH as the "Down" command, the mobile station UE decreases the transmission rate of the uplink user data, thereby a decrease unintended by the radio base station Node B in the transmission rate occurs.

Non-patent Document 1: 3GPP TSG-RAN TS25.309 V6.2.0

DISCLOSURE OF THE INVENTION

The present invention has been made in view of the above-described problems, and its object is to provide a transmission rate control method, a mobile station, and a radio base station that make it possible to improve a radio quality by preventing a decrease in a transmission rate of uplink user data, the decrease unintended by the radio base station Node B and caused by a false detection of a "Down" command in an RGCH, in the conventional mobile communication system using an "Enhanced Uplink."

A first aspect of the present invention is summarized as a transmission rate control method for controlling a transmission rate of uplink user data, including: transmitting, from a radio base station to a mobile station, a relative transmission rate control channel for instructing to decrease the transmission rate of the uplink user data, only when the uplink user data transmitted from the mobile station has been successfully received.

A second aspect of the present invention is summarized as a transmission rate control method for controlling a transmission rate of uplink user data, including: decreasing, at a mobile station, the transmission rate of the uplink user data in accordance with a relative transmission rate control channel for instructing to decrease the transmission rate of the uplink user data, only when a positive transmission acknowledgment signal from a radio base station has been received.

A third aspect of the present invention is summarized as a mobile station for transmitting uplink user data, including: a transmission rate control section configured to decrease a transmission rate of the uplink user data in accordance with a relative transmission rate control channel for instructing to decrease the transmission rate of the uplink user data, only when a positive transmission acknowledgment signal from a radio base station has been received.

A fourth aspect of the present invention is summarized as a radio base station used in a transmission rate control method for controlling a transmission rate of uplink user data, including: a relative grant channel transmitter configured to transmit, to a mobile station, a relative transmission rate control channel for instructing to decrease the transmission rate of the uplink user data, only when the uplink user data transmitted from the mobile station has been successfully received.

BEST MODES FOR CARRYING OUT THE INVENTION (Mobile Communication System According to a First Embodiment of the Present Invention)

Figure 11:
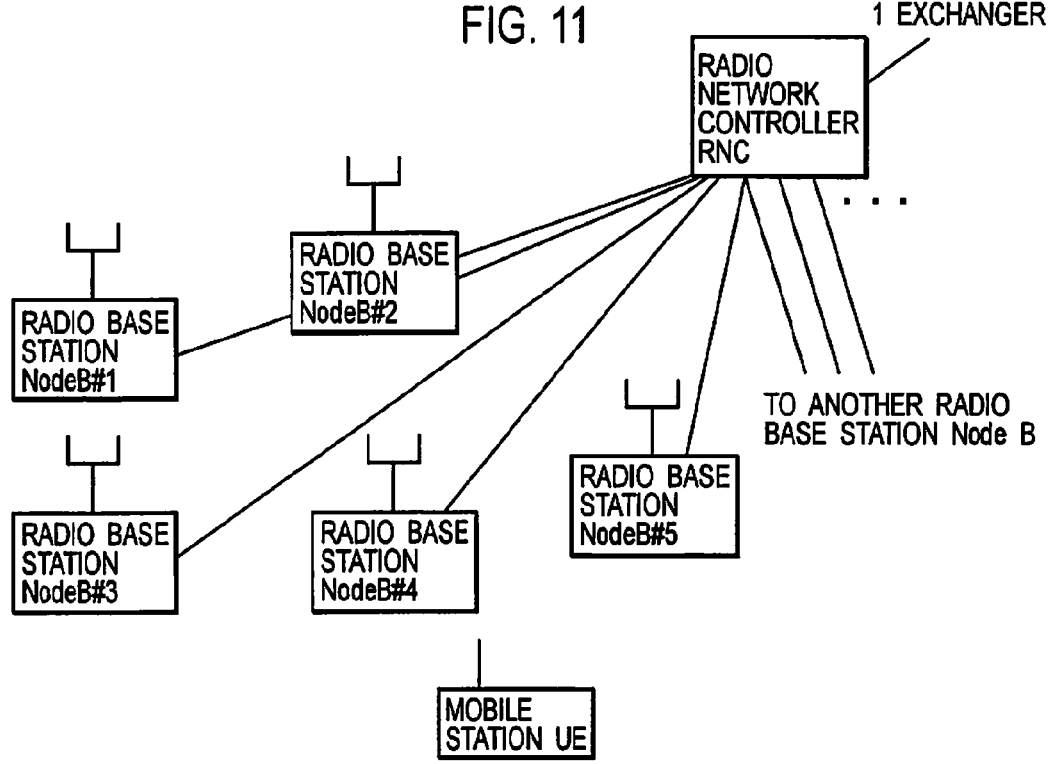
FIG. 11 is a diagram showing an entire configuration of a general mobile communication system.
Figure 12:
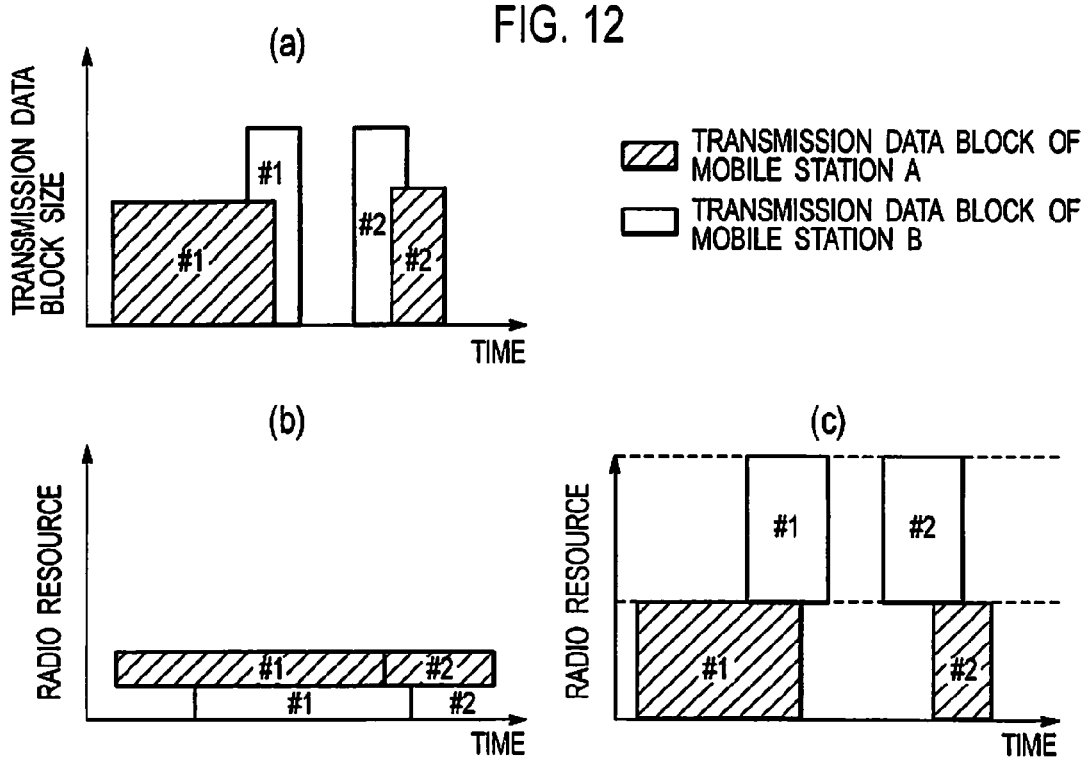
FIGS. 12(*a*) to 12(*c*) are graphs illustrating operations at the time of burst data transmission in a conventional mobile communication system.

An explanation will be given for the configuration of a mobile communication system according to a first embodiment of the present invention with reference to FIGS. 1 to 8. Note that the mobile communication system according to this embodiment includes a plurality of radio base stations Node B#1 to #5 and a radio network controller RNC, as shown in FIG. 11.

In addition, in the mobile communication system according to this embodiment, a "High Speed Downlink Packet Access (HSDPA)" is used in a downlink, and an "Enhanced Uplink (EUL)" is used in an uplink. It should be noted that in both of the HSDPA and the EUL, retransmission control (N process stop and wait) shall be performed by a "Hybrid Automatic Repeat Request (HARQ)".

Therefore, an Enhanced Dedicated Physical Channel (E-DPCH), configured of an Enhanced Dedicated Physical Data Channel (E-DPDCH) and an Enhanced Dedicated Physical Control Channel (E-DPCCH), and a Dedicated Physical Channel (DPCH), configured of a Dedicated Physical Data Channel (DPDCH) and a Dedicated Physical Control Channel (DPCCH), are used in the uplink.

Here, the E-DPCCH transmits control data for the EUL such as a transmission format number for defining a transmission format (transmission block size, or the like) of the E-DPDCH, HARQ related information (the number of retransmissions, or the like), and scheduling related information (transmission power, buffer residence-volume, or the like in the mobile station UE).

In addition, the E-DPDCH is paired with the E-DPCCH, and transmits user data for the mobile station UE based on the control data for the EUL transmitted through the E-DPCCH.

The DPCCH transmits control data such as a pilot symbol that is used for RAKE combining, SIR measurement, or the like, a Transport Format Combination Indicator (TFCI) for identifying a transmission format of uplink DPDCH, and a transmission power control bit in a downlink.

In addition, the DPDCH is paired with the DPCCH, and transmits user data for the mobile station UE based on the control data transmitted through the DPCCH. However, if user data to be transmitted does not exist in the mobile station UE, the DPDCH can be configured not to be transmitted.

In addition, in the uplink, a "High Speed Dedicated Physical Control Channel (HS-DPCCH)" and a Random Access Channel (RACH) are used, both of which are required when the HSPDA is applied.

The High Speed Dedicated Physical Control Channel (HS-DPCCH) transmits a Channel Quality Indicator (CQI) and a transmission acknowledgement signal ("Ack" or "Nack") for the HS-DPCCH.

Figure 1:
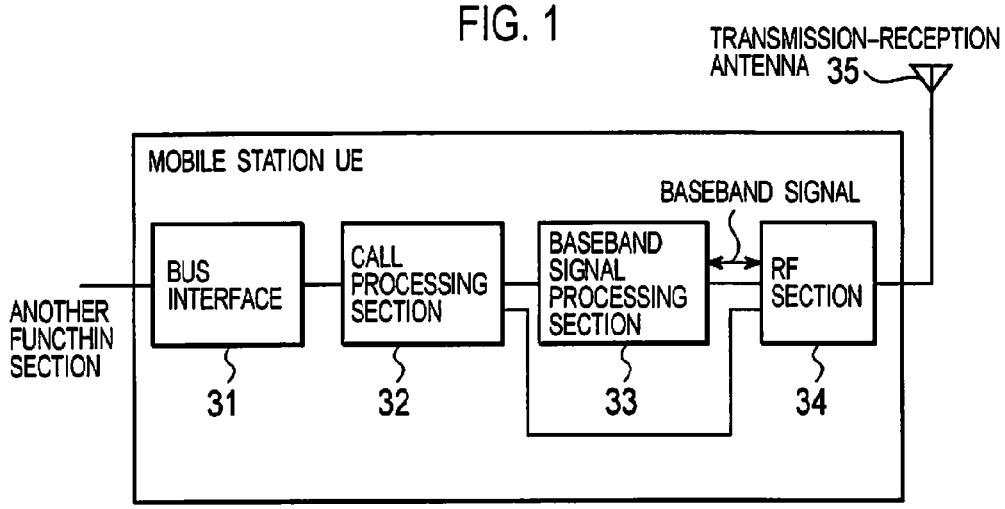
FIG. 1 is a functional block diagram of a mobile station of a mobile communication system according to the first embodiment of the present invention.

As shown in FIG. 1, the mobile station UE according to this embodiment is provided with a bus interface 31, a call processing section 32, a baseband processing section 33, a radio frequency (RF) section 34, and a transmission-reception antenna 35.

However, these functions can be independently present as a hardware, and can be partly or entirely integrated, or can be configured through a process of software.

The bus interface 31 is configured to forward user data outputted from the call processing section 32 to another functional section (for example, an application related functional section). In addition, the bus interface 31 is configured to forward user data transmitted from another functional section (for example, the application related functional section) to the call processing section 32.

The call processing section 32 is configured to perform a call control processing for transmitting and receiving user data.

The baseband signal processing section 33 is configured to, acquire user data by performing a layer-1 processing including a despreading processing, a RAKE combining processing, and a Forward Error Correction (FEC) decode processing, a Media Access Control (MAC) processing including a MAC-e processing and a MAC-d processing, and a Radio Link Control (RLC) processing, against the baseband signals transmitted from the RF section 34, so as to transmit the acquired user data to the call processing section 32.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later. The RF section 34 is configured to generate baseband signals by performing the detection processing, the filtering processing, the quantization processing, or the like against radio frequency signals received via the transmission-reception antenna 35, so as to transmit the generated baseband signals to the baseband signal processing section 33.

Figure 2:
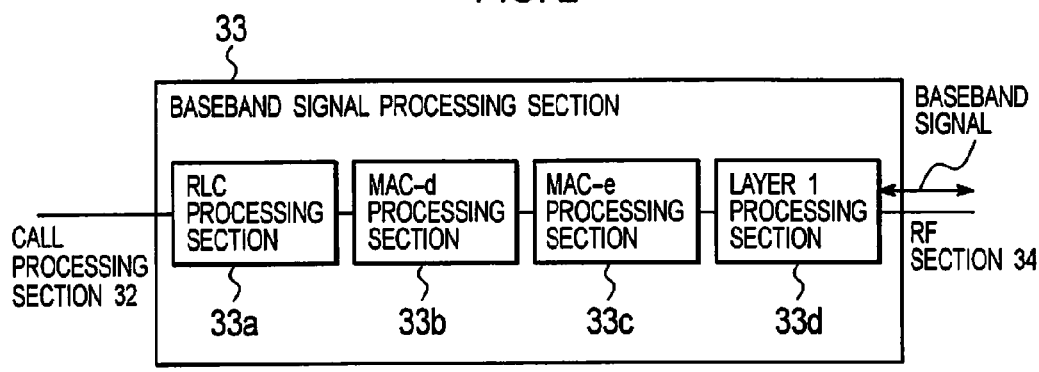
FIG. 2 is a functional block diagram of a baseband signal processing section in a mobile station of the mobile communication system according to the first embodiment of the present invention.

As shown in FIG. 2, the baseband signal processing section 33 is provided with an RLC processing section 33a, a MAC-d processing section 33b, a MAC-e processing section 33c, and a layer-i processing section 33d.

The RLC processing section 33a is configured to perform a processing (RLC processing) of an upper layer of a layer-2, against user data transmitted from the call processing section 32 so as to transmit the user data to the MAC-d processing section 33b.

The MAC-d processing section 33b is configured to attach a channel identifier header, and to generate the transmission format in the uplink in accordance with the transmission power limit in the uplink.

Figure 3:
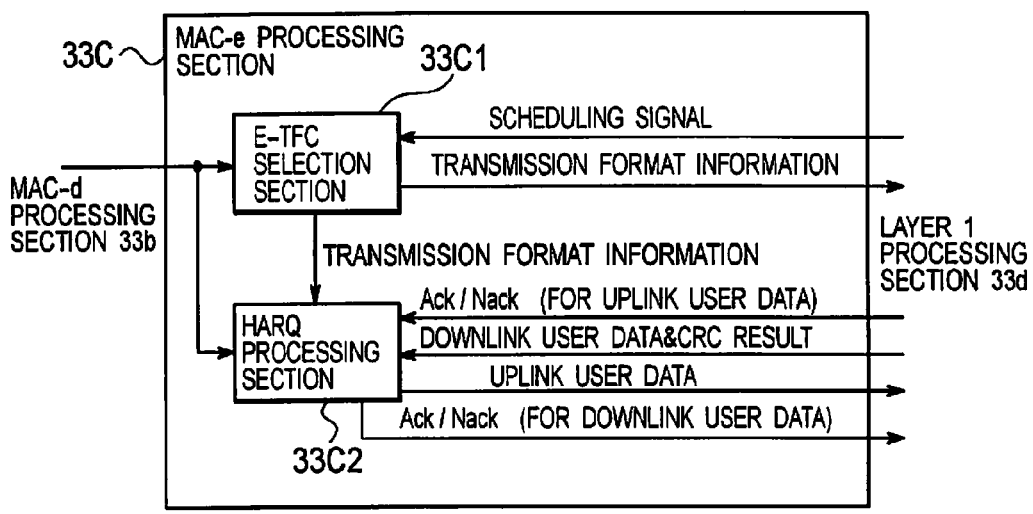
FIG. 3 is a functional block diagram of a MAC-e processing section of the baseband signal processing section in a mobile station of the mobile communication system according to the first embodiment of the present invention.

As shown in FIG. 3, the MAC-e processing section 33c is provided with an Enhanced Transport Format Combination (E-TFC) selecting section 33c1 and an HARQ processing section 33c2.

The E-TFC selecting section 33c1 is configured to determine a transmission format (E-TFC) of the E-DPDCH and the E-DPCCH, based on scheduling signals transmitted from the radio base station Node B.

In addition, the E-TFC selecting section 33c1 is configured to transmit transmission format information on the determined transmission format (that is, a transmission data block size, a transmission power ratio between the E-DPDCH and the DPCCH, or the like) to the layer-1 processing section 33d, and to transmit the determined transmission format information to the HARQ processing section 33c2.

The E-TFC selecting section 33c1 is configured to decrease the transmission rate of the uplink user data to be transmitted in the following transmission, in accordance with the RGCH for instructing to decrease the transmission rate (including the "Down" command), only when the positive transmission acknowledgment signal (Ack) for the transmission data block has been received from the radio base station Node B. Here, the transmission data block is included in the uplink user data transmitted in the previous transmission.

Such scheduling signals are information notified in the cell where the mobile station UE is located, and include control information for all the mobile stations located in the cell, or a specific group of the mobile stations located in the cell.

The HARQ processing section 33c2 is configured to perform process control for the "stop-and-wait of N-process", so as to transmit the user data in the uplink based on the transmission acknowledgement signals (Ack/Nack for uplink data) transmitted from the radio base station Node B.

Specifically, the HARQ processing section 33c2 is configured to determine, based on a CRC result entered from the layer-1 processing section 33d, whether or not the reception processing of the uplink user data has been successful. Then, the HARQ processing section 33c2 generates the transmission acknowledgement signal (Ack or Nack) based on the determination result, and transmits the generated transmission acknowledgement signal to the layer 1 processing section 33d. When the determination result is "OK", the HARQ processing section 33c2 transmits, to the MAC-d processing section 33d, the downlink user data entered from the layer 1 processing section 33d.

Figure 4:
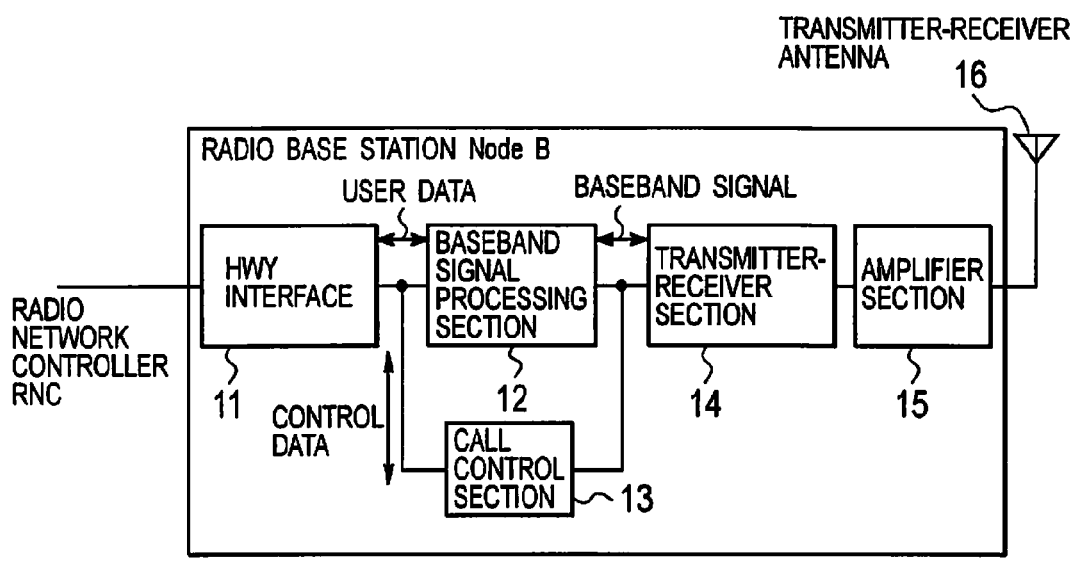
FIG. 4 is a functional block diagram of a layer-1 processing section of the baseband signal processing section in a mobile station of the mobile communication system according to the first embodiment of the present invention.

As shown in FIG. 4, the radio base station Node B according to this embodiment is provided with an HWY interface 11, a baseband signal processing section 12, a call control section 13, at least one transmitter-receiver section 14, at least one amplifier section 15, and at least one transmission-reception antenna 16.

The HWY interface 11 is an interface with a radio network controller RNC. Specifically, the HWY interface 11 is configured to receive user data transmitted from the radio network controller RNC to a mobile station UE via a downlink, so as to enter the user data to the baseband signal processing section 12. In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, user data included in the uplink signals which are transmitted from a mobile station UE via an uplink, so as to transmit the acquired user data to the radio network controller RNC. Further, the HWY interface 11 is configured to acquire control data for the radio network controller RNC from the call control section 13, so as to transmit the acquired control data to the radio network controller RNC.

The baseband signal processing section 12 is configured to generate baseband signals by performing such as the RLC processing, the MAC processing (MAC-d processing or MAC-e processing), and the layer-1 processing against the user data acquired from the HWY interface 11, so as to forward the generated baseband signals to the transmitter-receiver section 14.

Here, the MAC processing in the downlink includes an HARQ processing, a scheduling processing, a transmission rate control processing, or the like. In addition, the layer-1 processing in the downlink includes a channel coding processing of user data, a spreading processing, or the like.

In addition, the baseband signal processing section 12 is configured to extract user data by performing the layer-1 processing, the MAC processing (MAC-d processing or MAC-e processing), and the RLC processing against the baseband signals acquired from the transmitter-receiver section 14, so as to forward the extracted user data to the HWY interface 11.

Here, the MAC-e processing in the uplink includes an HARQ processing, a scheduling processing, a transmission rate control processing, a header disposal processing, or the like. In addition, the layer-1 processing in the uplink includes the despreading processing, the RAKE combining processing, an error correction decode processing, or the like.

Detailed description of the functions of the baseband signal processing section 12 will be given later. In addition, the call control section 13 is configured to perform a call control processing based on the control data acquired from the HWY interface 11.

The transmitter-receiver section 14 is configured to perform a processing of converting baseband signals acquired from the baseband signal processing section 12, into radio frequency signals (downlink signals), so as to transmit the converted radio frequency signals to the amplifier section 15. In addition, the transmitter-receiver 14 is configured to perform a processing of converting the radio frequency signals (uplink signals) acquired from the amplifier section 15, into the baseband signals, so as to transmit the converted baseband signals to the baseband signal processing section 12.

The amplifier section 15 is configured to amplify the downlink signals acquired from the transmitter-receiver section 14, so as to transmit the amplified downlink signals to the mobile station UE via the transmission-reception antenna 16. In addition, the amplifier 15 is configured to amplify the uplink signals received by the transmission-reception antenna 16, so as to transmit the amplified uplink signals to the transmitter-receiver section 14.

Figure 5:
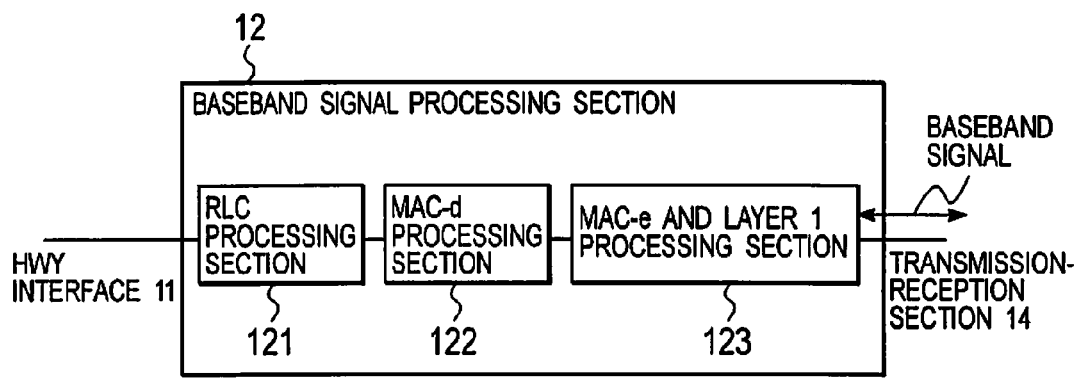
FIG. 5 is a functional block diagram of a radio base station of the mobile communication system according to the first embodiment of the present invention.

As shown in FIG. 5, the baseband signal processing section 12 is provided with an RLC processing section 121, a MAC-d processing section 122, and a MAC-e and layer 1 processing section 123.

The MAC-e and layer-1 processing section 123 is configured to perform, against the baseband signals acquired from the transmitter-receiver section 14, the despreading processing, a RAKE combining processing, an error correction decode processing, an HARQ processing, or the like.

The MAC-d processing section 122 is configured to perform a header disposal processing and the like, against an output signal from the MAC-e and layer 1 processing section 123.

The RLC processing section 121 is configured to perform such as a retransmission control processing in the RLC layer, a reconstruction processing in an RLC-SDU or the like, against the output signals from the MAC-d processing section 122.

However, these functions are not clearly divided per hardware, and can be acquired by software.

Figure 6:
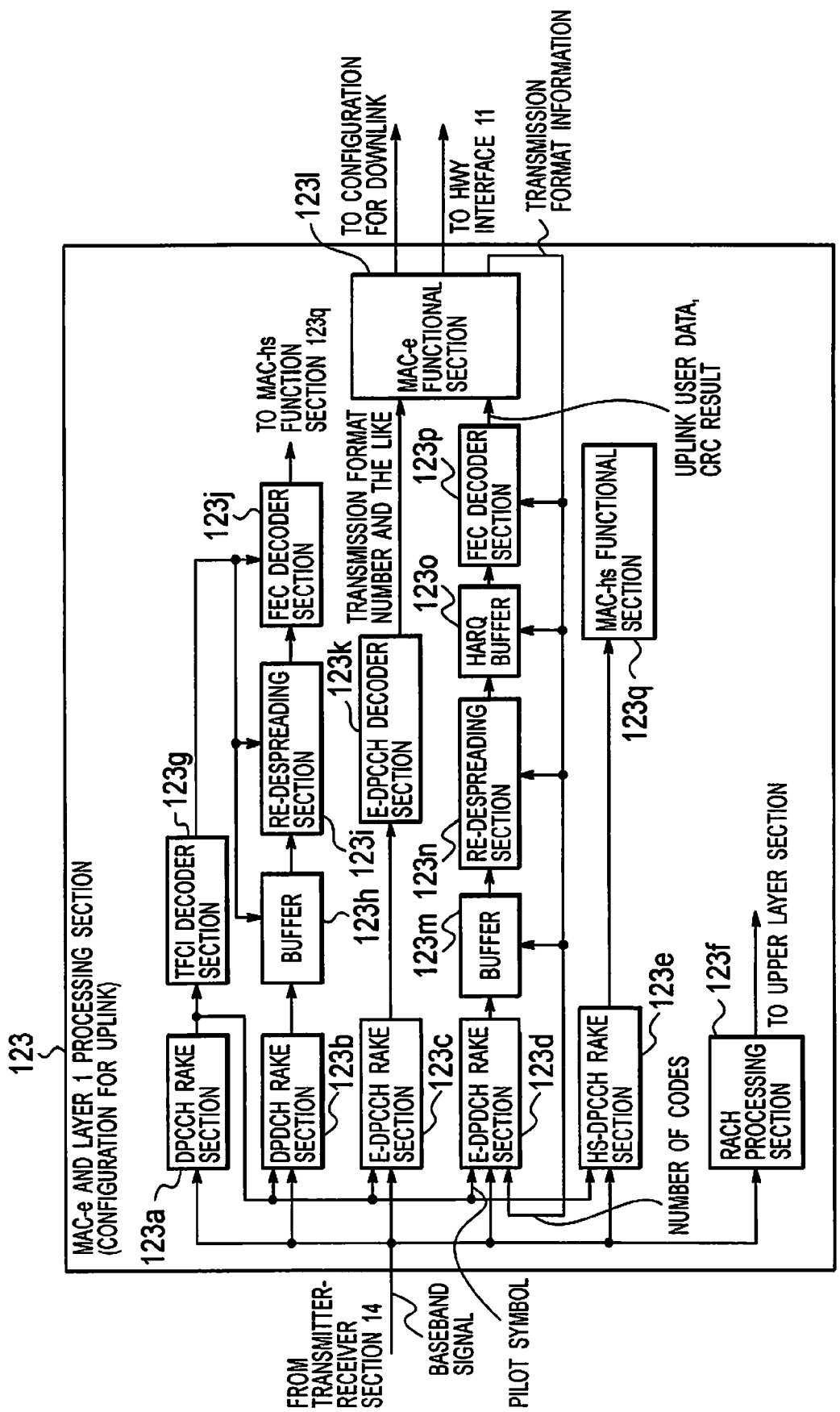
FIG. 6 is a functional block diagram of a baseband signal processing section in a radio base station of the mobile communication system according to the first embodiment of the present invention.

As shown in FIG. 6, the MAC-e and layer-1 processing section (configuration for the uplink) 123 is provided with a DPCCH RAKE section 123a, a DPDCH RAKE section 123b, an E-DPCCH RAKE section 123c, an E-DPDCH RAKE section 123d, an HS-DPCCH RAKE section 123e, an RACH processing section 123f, a Transport Format Combination Indicator (TFCI) decoder section 123g, buffers 123h and 123m, re-despreading sections 123i and 123n, FEC decoder sections 123j and 123p, an E-DPCCH decoder section 123k, a MAC-e functional section 123l, an HARQ buffer 123o, and a MAC-hs functional section 123q.

The E-DPCCH RAKE section 123c is configured to perform the despreading processing and the RAKE combining processing by using a pilot symbol included in the DPCCH, against the E-DPCCH in the baseband signals transmitted from the transmitter-receiver section 14.

The E-DPCCH decoder section 123k is configured to acquire transmission format number related information, HARQ related information, scheduling related information, or the like, by performing the decode processing against the RAKE combining outputs of the E-DPCCH RAKE section 123c, so as to enter the acquired information to the MAC-e functional section 123l.

The E-DPDCH RAKE section 123d is configured to perform a despreading processing by using the transmission format information (the number of codes) transmitted from the MAC-e functional section 123l and the RAKE combining processing using the pilot symbol included in the DPCCH, against the E-DPDCH in the baseband signals transmitted from the transmitter-receiver section 14.

The buffer 123m is configured to store the RAKE combining outputs of the E-DPDCH RAKE section 123d based on the transmission format information (the number of symbols) transmitted from the MAC-e functional section 123l.

The re-despreading section 123n is configured to perform a despreading processing against the RAKE combining outputs of the E-DPDCH RAKE section 123d stored in the buffer 123m, based on the transmission format information (a spreading factor) transmitted from the MAC-e functional section 123l.

The HARQ buffer 123o is configured to store the despreading processing outputs of the re-despreading section 123n, based on the transmission format information transmitted from the MAC-e functional section 123l.

The FEC decoder section 123p is configured to perform an error correction decoding processing (the FEC decoding processing) against the despreading processing outputs of the re-despreading section 123n, the outputs stored in the HARQ buffer 123o, based on the transmission format information (transmission data block size) transmitted from the MAC-e functional section 123l.

The MAC-e functional section 123l is configured to calculate and output the transmission format information (the number of codes, the number of symbols, the spreading factor, the transmission data block size, and the like) based on the transmission format number related information, the HARQ related information, the scheduling related information, and the like, which are acquired from the E-DPCCH decoder section 123k.

Figure 7:
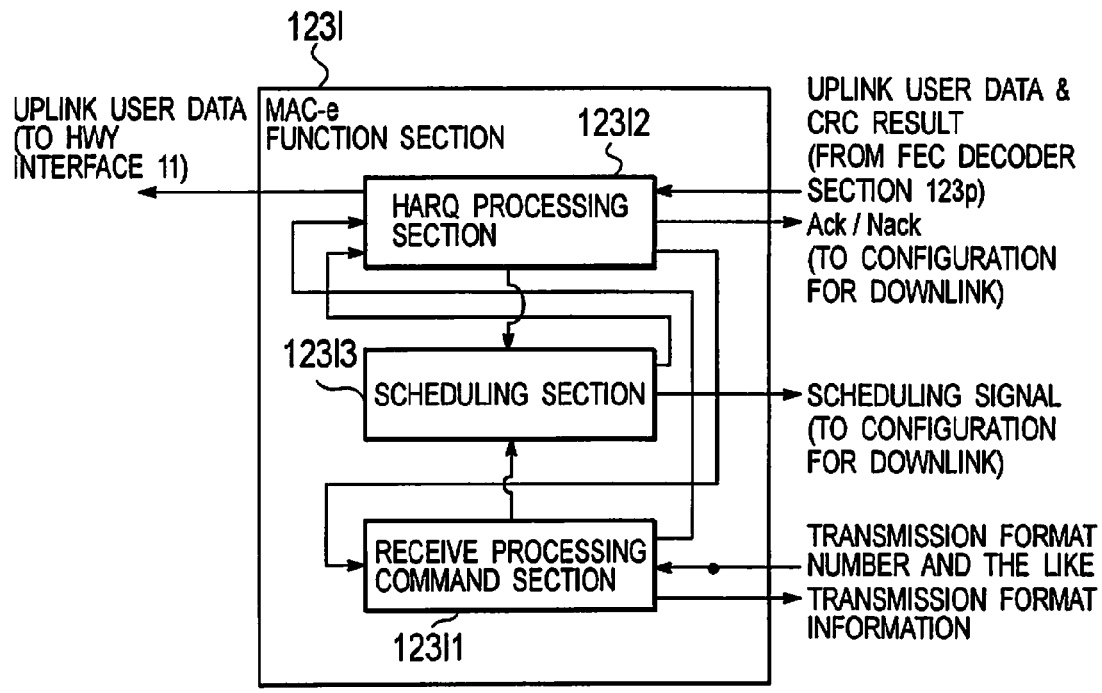
FIG. 7 is a functional block diagram of a MAC-e and layer-1 processing section (configuration for uplink), of the baseband signal processing section in a radio base station of the mobile communication system according to the first embodiment of the present invention.

In addition, as shown in FIG. 7, the MAC-e functional section 123l is provided with a receive processing command section 123l/1, an HARQ control section 123l/2, and a scheduling section 123l/3.

The receive processing command section 123l/1 is configured to transmit, to the HARQ control section 123l/2, the transmission format number related information, the HARQ related information, and the scheduling related information, which are entered from the E-DPCCH decoder section 123k.

In addition, the receive processing command section 123/1 is configured to transmit, to the scheduling section 123/3, the scheduling related information entered from the E-DPCCH decoder 123*k*.

Further, the receive processing command section 123/1 is configured to output the transmission format information corresponding to the transmission format number entered from the E-DPCCH decoder section 123*k*.

The HARQ control section 123/2 is configured to determine whether or not the reception processing of uplink user data has been successful, based on the CRC result entered from the FEC decoder section 123*p*. Then, the HARQ control section 123/2 is configured to generate the transmission acknowledgement signal (Ack or Nack), based on the determination result, so as to transmit the generated transmission acknowledgement signals to the configuration for the downlink of the baseband signal processing section 12. In addition, the HARQ control section 123/2 is configured to transmit the uplink user data entered from the FEC decoder section 123*p* to the radio network controller RNC, when the above determination result has been "OK".

In addition, the HARQ control section 123/2 is configured to clear soft decision information stored in the HARQ buffer 123*o* when the above determination result is "OK". On the other hand, when the above determination result is "NG", the HARQ control section 123/2 is configured to store the uplink user data in the HARQ buffer 123*o*.

In addition, the HARQ control section 123/2 is configured to forward the above determination result to the receive processing command section 123/1. Then, the receive processing control command section 123/1 is configured to notify the E-DPDCH RAKE section 123*d* and the buffer 123*m* of a hardware resource to be prepared for the following transmission time interval (TTI), so as to perform notification for reserving the resource in the HARQ buffer 123*o*.

In addition, when the uplink user data is stored in the buffer 123*m*, the receive processing command section 123/1 is configured to instruct the HARQ buffer 123*o* and the FEC decoder section 123*p* to perform the FEC decoding processing after concatenating, per TTI, a newly received uplink user data and the uplink user data in a process corresponding to the TTI, the uplink user data stored in the HARQ buffer 123*o*.

The scheduling section 123/3 is configured to transmit scheduling signals (such as the RGCH or the like) via a configuration for downlink.

Further, the scheduling section 123/3 is configured to transmit, to the mobile station UE, the RGCH for instructing to decrease the transmission rate (including the "Down" command) of the uplink user data to be transmitted in the following transmission, only when the reception/decoding processing on the transmission data block has been successful. Here, the transmission data block is included in the uplink user data transmitted from the mobile station UE in the previous transmission.

The radio network controller RNC according to the present embodiment is an apparatus located on upper level of the radio base station Node B and configured to control radio communication between the radio base station Node B and the mobile station UE.

Figure 8:
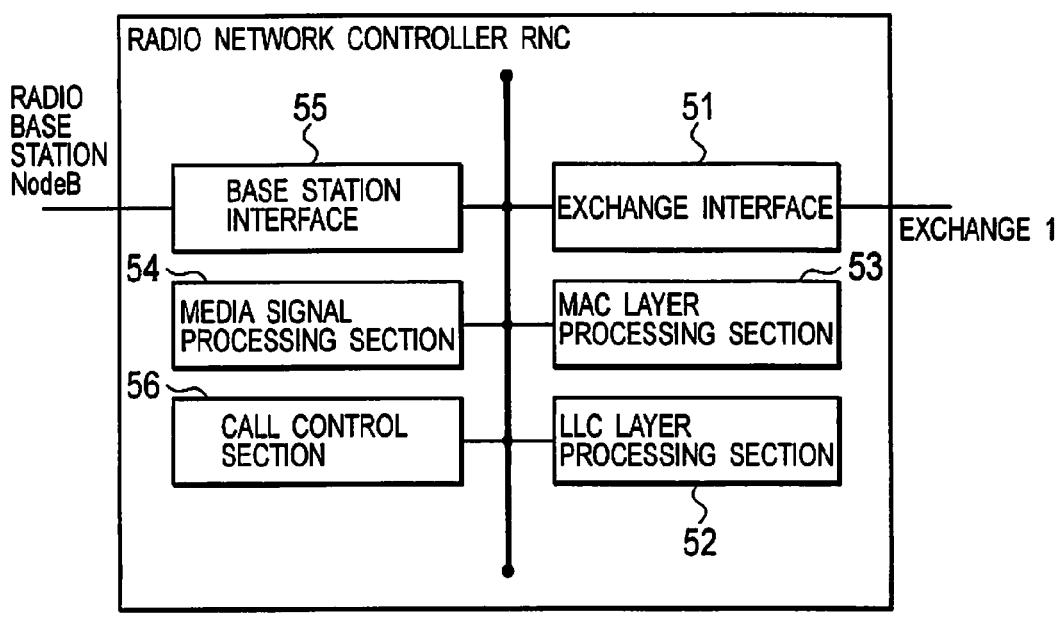
FIG. 8 is a functional block diagram of a MAC-e functional section of the MAC-e and layer-1 processing section (configuration for uplink), of the baseband signal processing section in a radio base station of the mobile communication system according to the first embodiment of the present invention.

As shown in FIG. 8, the radio network controller RNC according to this embodiment is provided with an exchange interface 51, a Logical Link Control (LLC) layer processing section 52, a MAC layer processing section 53, a media signal processing section 54, a radio base station interface 55, and a call control section 56.

The exchange interface 51 is an interface with an exchange 1. The exchange interface 51 is configured to forward the downlink signals transmitted from the exchange 1 to the LLC layer processing section 52, and to forward the uplink signals transmitted from the LLC layer processing section 52 to the exchange 1.

The LLC layer processing section 52 is configured to perform an LLC (Logical Link Control) sub-layer processing such as a synthesis processing of a header (e.g. a sequence number), a trailer, or the like. The LLC layer processing section 52 is also configured to transmit the uplink signals to the exchange interface 51 and to transmit the downlink signals to the MAC layer processing section 53, after the LLC sub-layer processing is performed.

The MAC layer processing section 53 is configured to perform a MAC layer processing such as a priority control processing or a header granting processing. The MAC layer processing section 53 is also configured to transmit the uplink signals to the LLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals. The media signal processing section 54 is also configured to transmit the uplink signals to the MAC layer processing section 53 and to transmit the downlink signals to the radio base station interface 55, after the media signal processing is performed.

The radio base station interface 55 is an interface with the radio base station Node B. The radio base station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing, a channel setup and open processing by the layer-3 signaling, or the like. Here, the radio resource control processing includes a call admission control processing, a handover processing, or the like.

Figure 9:
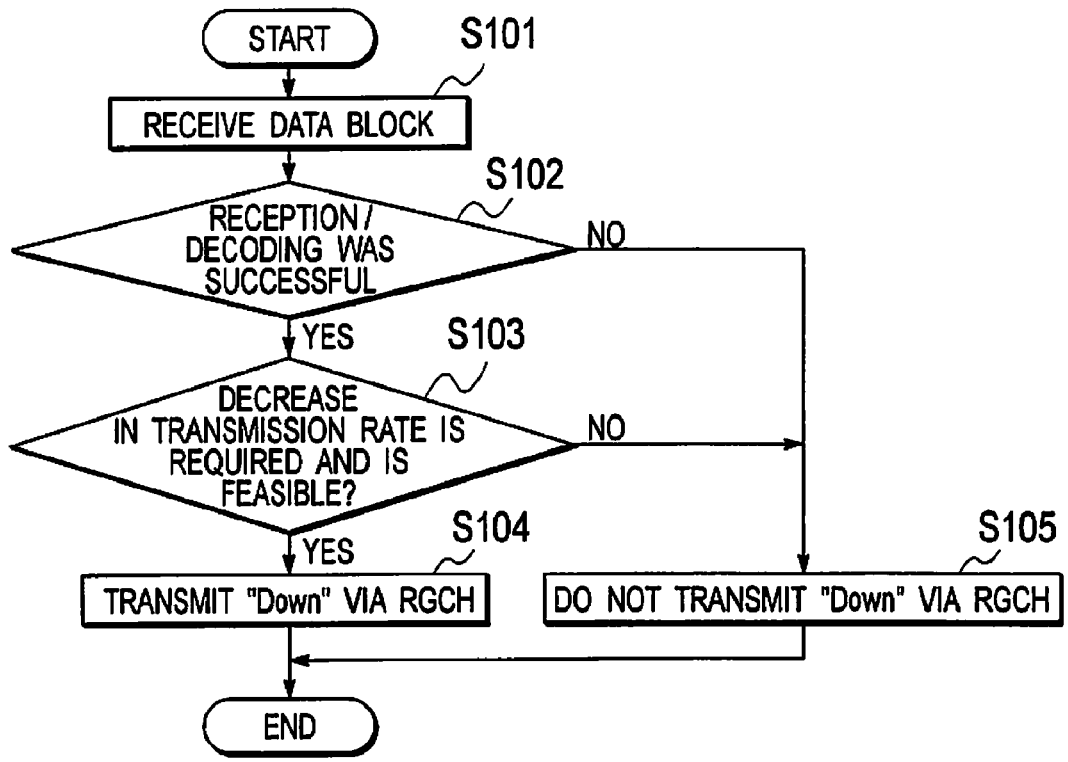
FIG. 9 is a flowchart showing an operation of the radio base station of the mobile communication system according to the first embodiment of the present invention.
Figure 10:
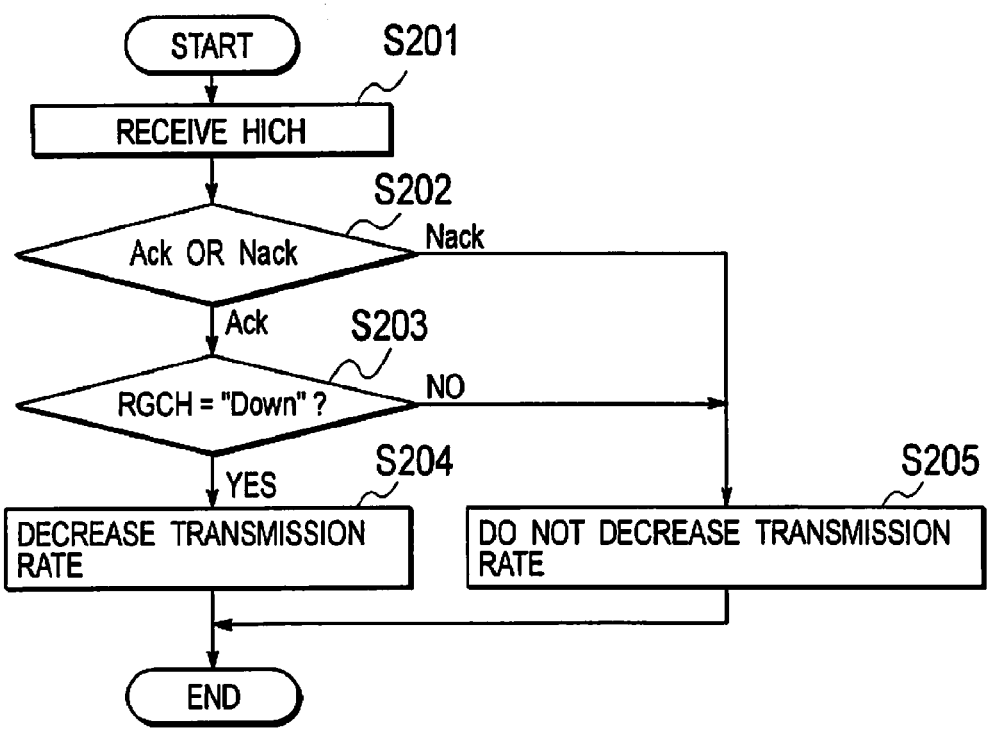
FIG. 10 is a flowchart showing an operation of the mobile station of the mobile communication system according to the first embodiment of the present invention.

Descriptions will be given for an operation of the mobile communication system according to the first embodiment of the present invention with reference to FIGS. 9 and 10. FIG. 9 shows an operation of a radio base station Node B according to the first embodiment of the present invention, and FIG. 10 shows an operation of the radio base station Node B according to the first embodiment of the present invention.

As shown in FIG. 9, in step S101, the radio base station Node B receives a transmission data block including uplink user data transmitted from a mobile station UE.

In steps S102 and S103, when a reception/decoding processing against the transmission data block has been successful, and when a decrease in a transmission rate of the uplink user data is required and is feasible, in step S104, the radio base station Node B transmits an RGCH including a "Down" command.

On the other hand, in steps S102 and S103, when a reception/decoding processing against the transmission data block has not been successful or when the decrease in the transmission rate of the uplink user data is not required or is not feasible, in step S105, the radio base station Node B does not transmit the RGCH including the "Down" command.

As shown in FIG. 10, in step S201, the mobile station receives an HICH.

In steps S202 and S203, when a positive transmission acknowledgment signal (Ack) was received via the HICH, and when the "Down" command is included in the received RGCH, in step S204, the mobile station UE decreases the transmission rate of the uplink user data.

On the other hand, in steps S202 and S203, when a negative transmission acknowledgment signal (Nack) was received via the HICH, or when the "Down" command is not included in the received RGCH, in step S205, the mobile station UE does not decrease the transmission rate of the uplink user data.

It should be noted that the present invention is not limited to the above-mentioned embodiment, and various modifications are possible.

INDUSTRIAL APPLICABILITY

As described above, according to the present invention, it is possible to provide a transmission rate control method, a mobile station, and a radio base station that make it possible to improve a radio quality by preventing a decrease in a transmission rate of uplink user data, the decrease unintended by the radio base station Node B and caused by a false detection of a "Down" command in an RGCH, in the conventional mobile communication system using an "Enhanced Uplink."

What is claimed is:

1. A transmission rate control method for controlling a transmission rate of uplink user data, comprising:
   decreasing, at a mobile station, the transmission rate of the uplink user data in accordance with a relative transmission rate control channel for instructing to decrease the transmission rate of the uplink user data, only when the mobile station receives the positive transmission acknowledgement signal from a radio base station, wherein the mobile station does not follow the relative transmission rate control channel for instructing to decrease the transmission rate of the uplink user data, when the positive transmission acknowledgement signal is not received, wherein
   the positive transmission acknowledgement signal is transmitted separately from the relative transmission rate control channel;
   the mobile station decreases the transmission rate of the uplink user data in accordance with a relative transmission rate control channel for instructing to decrease the transmission rate after receiving a positive transmission acknowledgement signal; and
   the mobile station does not decrease the transmission rate of the uplink user data in accordance with a relative transmission rate control channel for instructing to decrease the transmission rate before receiving a positive transmission acknowledgement signal.

2. A mobile station for transmitting uplink user data, comprising:
   a transmission rate control section configured to decrease a transmission rate of the uplink user data in accordance with a relative transmission rate control channel for instructing to decrease the transmission rate of the uplink user data, only when the mobile station receives the positive transmission acknowledgement signal from a radio base station, wherein the mobile station does not follow the relative transmission rate control channel for instructing to decrease the transmission rate of the uplink user data, when the positive transmission acknowledgement signal is not received, wherein
   the positive transmission acknowledgement signal is transmitted separately from the relative transmission rate control channel;
   the mobile station decreases the transmission rate of the uplink user data in accordance with a relative transmission rate control channel for instructing to decrease the transmission rate after receiving a positive transmission acknowledgement signal; and
   the mobile station does not decrease the transmission rate of the uplink user data in accordance with a relative transmission rate control channel for instructing to decrease the transmission rate before receiving a positive transmission acknowledgement signal.

* * * * *